US007165472B2

(12) United States Patent
Jo et al.

(10) Patent No.: US 7,165,472 B2
(45) Date of Patent: Jan. 23, 2007

(54) CONTROL LEVER SAFETY APPARATUS FOR HEAVY EQUIPMENT

(75) Inventors: Chun Ho Jo, Changwon (KR); Chun Jin Yoon, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/180,010

(22) Filed: Jul. 12, 2005

(65) Prior Publication Data

US 2005/0247152 A1 Nov. 10, 2005

Related U.S. Application Data

(62) Division of application No. 10/602,452, filed on Jun. 24, 2003, now Pat. No. 6,971,279.

(30) Foreign Application Priority Data

Feb. 12, 2003 (KR) ...................... 10-2003-0008834
Feb. 13, 2003 (KR) ...................... 10-2003-0008991

(51) Int. Cl.
*G05G 1/04* (2006.01)
*B60D 1/28* (2006.01)

(52) U.S. Cl. .......................... 74/524; 74/523; 180/329; 180/286; 180/287; 180/271

(58) Field of Classification Search .................. 74/491, 74/523, 524, 528; 180/269, 271, 286, 287, 180/329, 332; *G05G 1/04, 5/00; E02F 9/24*
See application file for complete search history.

(56) References Cited

U.S. PATENT DOCUMENTS 3,715,002 A 2/1973 Halls et al.

(Continued)

FOREIGN PATENT DOCUMENTS

GB 2 315 843 2/1998

(Continued)

OTHER PUBLICATIONS

English Abstract of JP 2002-123327 dated Apr. 26, 2002.

(Continued)

*Primary Examiner*—Vinh T. Luong
(74) *Attorney, Agent, or Firm*—Ladas & Parry LLP

(57) ABSTRACT

A control lever safety apparatus for a heavy equipment which is capable of preventing an operation of a work apparatus when a control lever is operated or touched in a state that an equipment is started, in such a manner that a safety lever is tilted in a lower direction in the case that a consol box installed in a side surface of a driver's seat is tilted. There are provided a safety lever and consol box tilting lever which are rotatably fixed to a first support in which a consol box of a side f an entrance door of a driving room is fixed, an operation switch assembly which is connected with the consol box tilting lever based on a link movement method and supports the safety lever in a horizontal direction and tilts the safety lever in a lower direction when the consol box tilting lever is rotated for thereby disconnecting a power connected with the control lever, and a latch assembly which is connected with the operation switch assembly based on a link movement method and tilts the consol box in an upper direction when the consol box tilting lever is rotated for thereby disconnecting a power connected with the control lever.

1 Claim, 12 Drawing Sheets

U.S. PATENT DOCUMENTS

| | | | | |
|---|---|---|---|---|
| 4,008,626 | A | 2/1977 | Schulte et al. | |
| 4,072,343 | A * | 2/1978 | Meza | 297/93 |
| 5,050,700 | A | 9/1991 | Kim | |
| 5,383,532 | A | 1/1995 | Shonai et al. | |
| 5,664,637 | A | 9/1997 | Ohta et al. | |
| 5,860,488 | A * | 1/1999 | Kim | 180/271 |
| 6,450,284 | B1 | 9/2002 | Sakyo et al. | |

FOREIGN PATENT DOCUMENTS

| | | |
|---|---|---|
| JP | 4250230 | 9/1992 |
| JP | 9-13425 | 1/1997 |
| JP | 9-165787 | 6/1997 |
| JP | 10-292425 | * 11/1998 |
| JP | 2000-328605 | 11/2000 |
| JP | 2002-123327 | 4/2002 |

OTHER PUBLICATIONS

English Abstract of JP 2000-328605 dated Nov. 28, 2000.
English Abstract of JP 4-250230 dated Sep. 7, 1992.
Patent Abstracts of Japan of JP 04044533 dated Feb. 14, 1992.
English Abstract of JP 9-13425 dated Jan. 14, 1997.
English Abstract of JP 9-165787 dated Jun. 24, 1997.

* cited by examiner

PRIOR ART

CONTROL LEVER SAFETY APPARATUS FOR HEAVY EQUIPMENT

This is a divisional of application Ser. No. 10/602,452 filed on Jun. 24, 2003 now U.S. Pat. No. 6,971,279 claims the benefit thereof and incorporates the same by reference.

BACKGROUND OF THE INVENTION

1. Field of the Invention

The present invention relates to a control lever safety apparatus for a heavy equipment which is capable of preventing an operation of a work apparatus even when a control lever is operated or touched by mistake in a state that an equipment is started in such a manner that a safety lever is tilted downwardly when a consol box installed in a side of a driver's seat is tilted, so that an electrical signal connected with a control lever is disconnected.

2. Description of the Background Art

As shown in FIG. 1, in a control lever safety apparatus for a heavy equipment in a conventional art, a consol box 2 having a control lever 1 is installed in a side of a driver's seat for operating a work apparatus. The consol box 2 is tiltable about a hinge pin 7 by an extension operation of a gas spring 4 having one end fixed to a bracket 3 to which a driver's seat is fixed. A limit switch 5 is engaged in a lower surface of the consol box 2 for opening and closing a solenoid valve as the power is on and off based on an operation of the consol box 2. A safety lever 6 is tiltably installed in a side of the consol box 2 for preventing a malfunction of a work apparatus in such a manner that the power of the work apparatus is turned off as the consol box 2 is tilted as a driver leaves the seat for thereby disconnecting an electrical signal supplied to the consol box 2.

In the drawings, reference numeral 8 represents a support which supports the consol box 2, and 9 represents an elastic member which elastically bias-supports in an initial state that the power of the limit switch 5 is connected by supporting the safety lever 6.

Therefore, in the case that a driver leaves from the seat during a work, when operating a locking lever(not shown), a locked state of the consol box 2 may be released, and the consol box 2 may be rotated in a clockwise direction about the hinge pin 7 based on an extension operation of the gas spring 4 as indicated by the imaginary line in FIG. 1, so that the power of the limit switch 5 is switched to an off state, and it is possible to prevent an operation oil from being supplied to the work apparatus based on a driving operation of the solenoid valve(not shown).

Therefore, in the case that a driver leaves from the seat in a state that the equipment is started, if the driver operates or touches the control lever 1 due to a driver's mistake, it is possible to prevent a safety accident in such a manner that the operation of the work apparatus is stopped.

In addition, when a driver drives a work apparatus in a state that the equipment is started, assuming that the consol box 2 is tilted, the power of the limit switch 5 related to the control lever 1 is in a turned on state between the time when the driver pressurizes the consol box 2 using a pressing handle 2*a* in order for the consol box 2 to be returned to an initial state(it refers to a switching operation from the tilting state indicated by the imaginary line of FIG. 1 to the initial state indicated by the full line) and the time when the locking apparatus of the consol box 2 is locked.

Therefore, if a driver touches the control lever 1 due to a mistake or a unstable surrounding environment factor of a driver when pressurizing the consol box 2, the work apparatus may be operated(for example, arm in or arm out, and rotation of equipment, etc.), the equipment may be damaged or a certain worker near the equipment may be injured thereby causing a big safety accident, resulting in loss in a human and physical property.

SUMMARY OF THE INVENTION

Accordingly, it is an object of the present invention to provide a control lever safety apparatus for a heavy equipment which is capable of preventing an operation of a work apparatus even when a driver operates or touches a control lever by mistake in a state that an equipment is started in such a manner that an electrical signal connected with a control lever is automatically disconnected based on a tilting operation of a safety lever in the case that a consol box is tilted so that a driver leaves from a seat.

It is another object of the present invention to provide a control lever safety apparatus for a heavy equipment which is capable of providing a desired convenience to a driver by selectively adjusting a height of a control lever which is required based on a body shape of a driver and enhancing a workability by performing a work under the optimum operation condition even when a driver works in the same posture for a long time.

It is further another object of the present invention to provide a control lever safety apparatus for a heavy equipment which is capable of preventing a safety accident which may occur due to a mistake operation of a control lever even when the type (wheel type or crawler type) of an equipment is changed, by integrating the operation method of the safety lever.

To achieve the above objects, there is provided a control lever safety apparatus for a heavy equipment which includes a consol box which is tiltably installed at one side surfaces of a driver's seat and is adapted to operate a work apparatus, a safety lever which is rotatably fixed to a first support to which the consol box is fixed, a consol box tilting lever which is rotatably fixed to the first support, an operation switch assembly which is fixed to the first support based on a link movement method with the consol box tilting lever and supports the safety lever in a horizontal direction and disconnects a power of a first limit switch connected with the control lever by tilting the safety lever in a lower direction when the consol box tilting lever is rotated, and a latch assembly which is connected to a rod connected with a joint method based on a link movement method and disconnects a power of a second limit switch connected with the control lever by tilting the consol box in an upper direction when the consol box tilting lever is rotated, in such a manner that a latch fixed to the first support is detachably engaged to the second support in which a driving seat is fixed.

In addition, in the case that at least one of the first and second limit switches is disconnected, an electrical signal supplied to the control lever is disconnected.

A lifting and lowering unit adapted to lift and lower the consol box includes a handle shaft which is fixed to a bracket formed in a side surface of the second support and has an adjusting knob formed in one end of the same and has a threaded portion in an outer surface, and a pair of link members which are adapted to adjust the height of the control lever in such a manner that each hinge connection portion is engaged to a threaded portion of the handle shaft, and the rotary shaft formed in a front side of the second support is lifted and lowered about a hinge shaft formed in a rear side of the second support as a center axis in a rotation direction of the handle shaft.

The operation switch assembly includes a first joint which has one end hinged to a lower portion of the consol box tilting lever and is fixed to the first support, a second joint which has one end hinged to the other end of the first joint and has an elongated hole in the other end of the same, a locking shaft which is engaged to the elongated hole and is connected to a lever adapted to turn on and off the power of a first limit switch, and an elastic member which supports the locking shaft in order for the power of the first limit switch to maintain an on state and maintains the safety lever in a horizontal direction as an initial state based on an elastic bias operation.

The latch assembly includes a first latch which is hinged to the other end of a rod and is rotatably fixed to a second support in which a driver's seat is engaged, a second latch which has a locking groove detachably engaged to the locking shaft fixed to the second support and is rotatably fixed to the second support, an elastic member which closely contacts the second latch to an outer surface of the first latch and engages the locking groove with respect to the second latch based on an elastic bias operation as an initial state, and a gas spring which is fixed to the second support and the first support and escapes the second latch from the locking shaft based on a movement of the rod when the consol box tilting lever is rotated and turns off the power of the second limit switch.

To achieve the above objects of the present invention, there is provided a control lever safety apparatus for a heavy equipment which includes a consol box which is installed at one side surfaces of a driver's seat and has a control lever for operating a work apparatus, a first limit switch which is connected with the control lever, a safety lever which is rotatably fixed to a first support to which the consol box is fixed, a locking shaft which is connected with a lever adapted to turn on and off the power of the first limit switch, and an elastic member which supports the locking shaft in order for the power of the first limit switch to maintain an on state and maintains the safety lever in a horizontal direction based on an elastic bias operation as an initial state.

The operation switch assembly includes a first joint which has one end hinged to a lower portion of the consol box tilting lever, a second joint which is hinged to the other end of the first joint, a catch plate which is hinged to the other end of the second joint and has a locking groove in one side of the same, a locking shaft which is engaged to the locking groove and maintains a safety lever in a horizontal state, and an elastic member which engages the locking shaft to the locking groove and maintains the safety lever in a horizontal state in order for the power of the first limit switch to maintain an on state based on an elastic bias operation as an initial state.

The safety lever, consol box tilting lever, operation switch assembly and latch assembly are fixed to an additional support which is rotatably fixed to a support in which a driver's seat is engaged.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
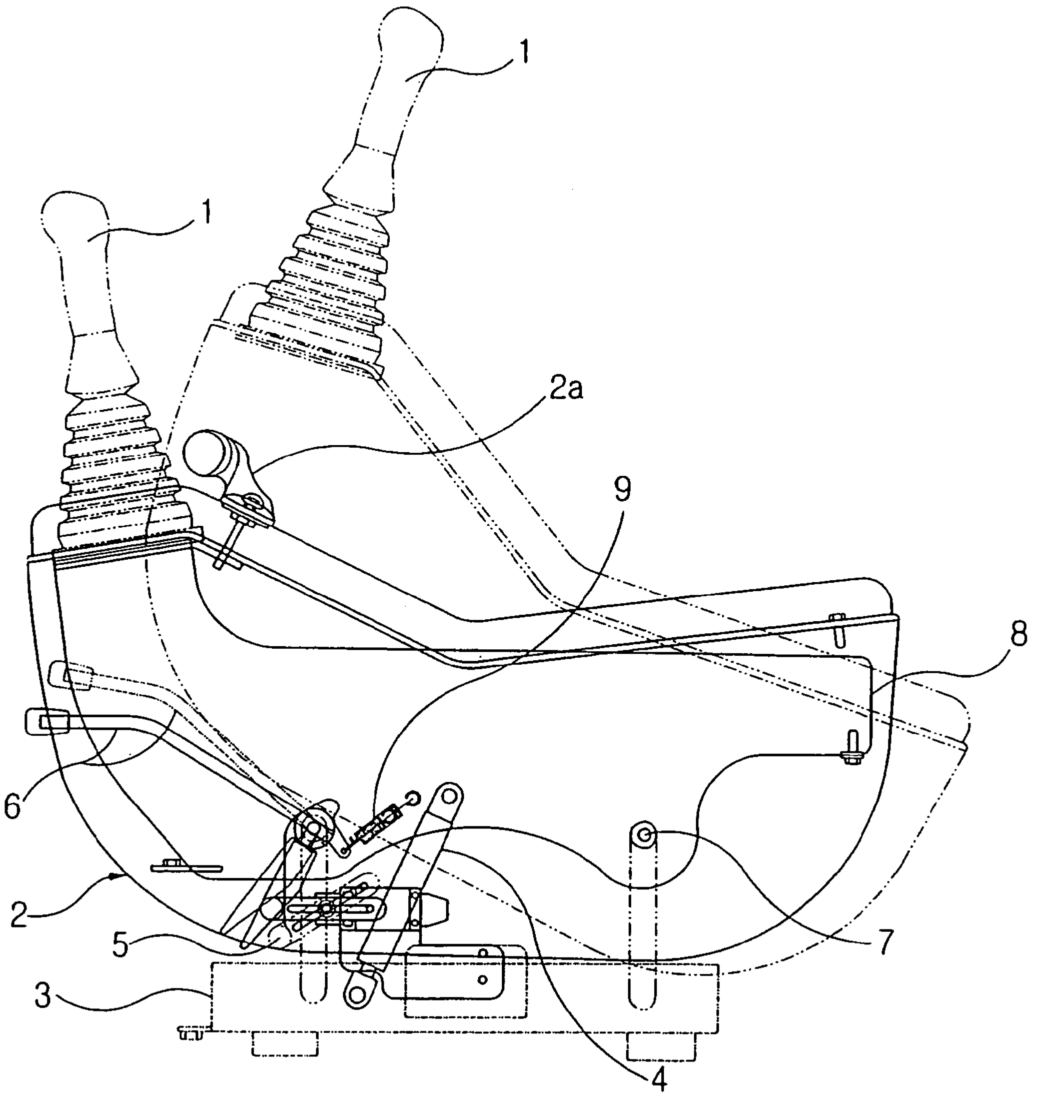
FIG. 1 is a view illustrating a sate of use of a safety lever engaged to a consol box in a conventional art.
Figure 2:
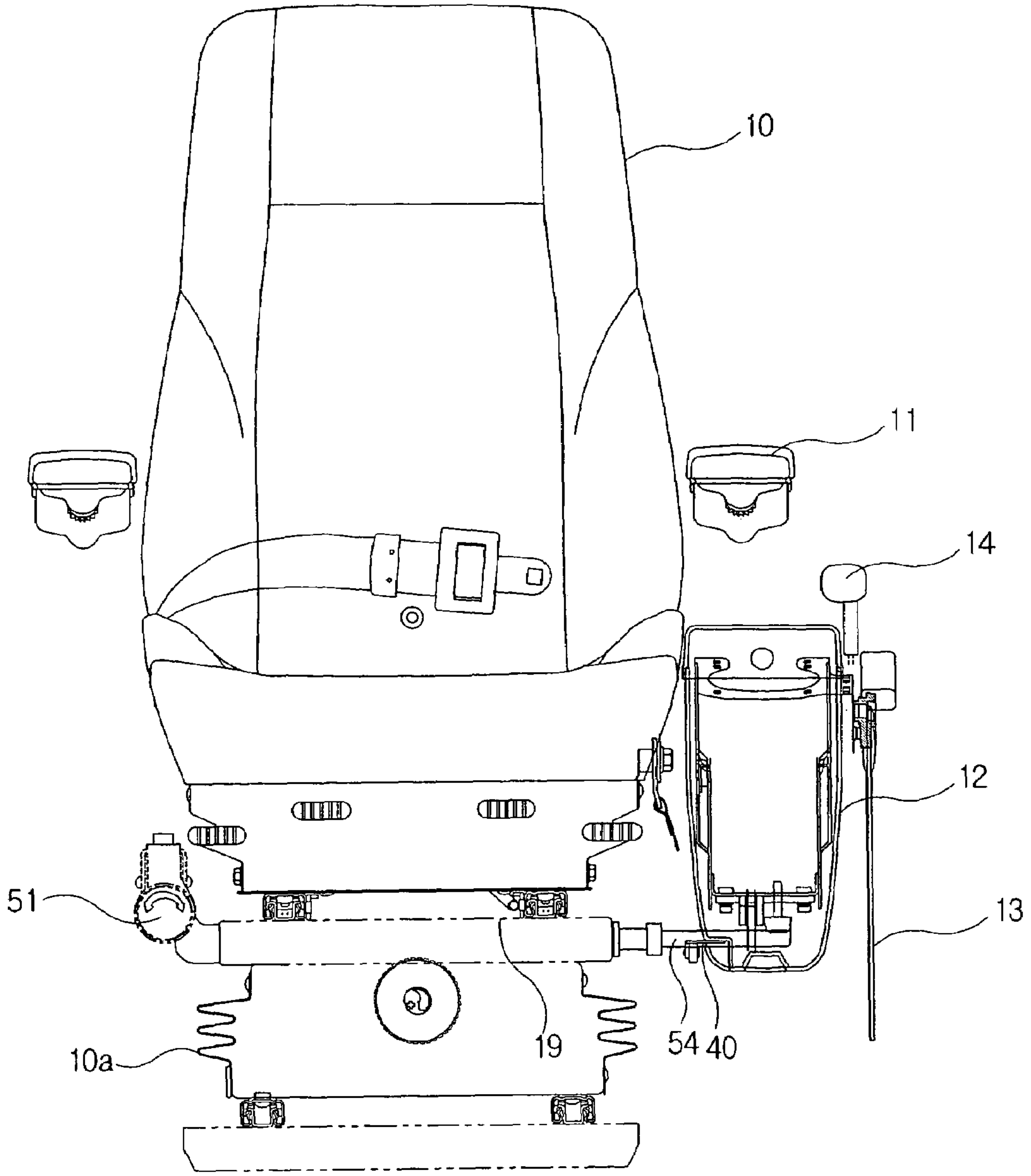
FIG. 2 is a front view illustrating a state that a control lever safety apparatus for a heavy equipment is engaged according to the present invention.

The preferred embodiments of the present invention will be described with reference to the accompanying drawings.

As shown in FIGS. 2 through 9, the control lever safety apparatus for a heavy equipment according to the present invention includes a consol box 12 which is tiltably installed at one side of a driver's seat 10 and has a control lever 11 for operating a work apparatus(not shown) such as a boom, etc., a safety lever 13 which is rotatably fixed to a first support 23 to which the consol box 12 in a side of an entrance door of a driving room is fixed, a consol box tilting lever 14 which is rotatably fixed to the first support 23, an operation switch assembly 17 which is rotatably connected with a joint member 15 fixed to a first support 23 to be link-moved with the consol box tilting lever 14 and horizontally supports the safety lever 13 and disconnects a power of a first limit switch 16 connected with the control lever 11 by downwardly tilting the safety lever 13 when the consol box tilting lever 14 is rotated, and a latch assembly 22 which is connected with a rod 18 link-moved with the joint member 15 and disconnects a power of a second limit switch 21 connected with the control lever 11 by upwardly tilting the consol box 12 by rotating the consol box tilting lever 14 in such a manner that a latch 20 fixed to the first support 23 is detachably engaged to the second support 19 in which a driving seat 10 is engaged.

At this time, the operation switch assembly 17 includes a fist joint 15*a* which has an end hinged to a lower portion of the consol box tilting lever 14 and is fixed to the first support 23, a second joint 15*c* which has one end hinged to the other end of the first joint 15*a* and the other end having an elongated hole 15*b* formed therein, a locking shaft 24 which is engaged to the elongated hole 15*b* and is connected with a lever 16*a* adapted to turn on and off the power of the first limit switch 16, and an elastic member 25 which supports the locking shaft 24 in order for the power of the first limit switch 16 to maintain an on state and implements an elastic bias state that the safety lever 13 maintains a horizontal state as the initial state.

The latch assembly 22 includes a first latch 20*a* which is hinged to the other end of the rod 18 and is rotatably fixed to the second support 19, a second latch 20*b* which has a locking groove 27 detachably engaged with the locking shaft 26 fixed to the second support 17 and is rotatably fixed to the second support 19, an elastic member 28 which elastically engages the locking groove 27 with respect to the locking shaft 26 as an initial state in such a manner that the second latch 20*b* is closely contacted with an outer surface of the first latch 20*a,* and a gas spring 29 which is rotatably hinged to the second support 19 and the first support 23, respectively and escapes the second latch 20*b* from the locking shaft 26 based on a movement of the rod 18 when the consol box tilting lever 14 is rotated and disconnects the power of the second limit switch 21.

The lifting and lowering unit which lifts and lowers the consol box 12 includes a handle shaft 52 which is fixed to a bracket 50 formed in a side surface of the second support 19 and has a fixing knob 51 formed in one end of the same and a threaded portion formed in an outer surface of the same, and a pair of link members 55 and 56 in which each hinge connection portion is engaged to the threaded portion of the handle shaft 52, for thereby lifting and lowering a rotary shaft 54 formed in a front portion of the second support 19 about the hinge shaft 53 formed in a rear side of the second support 19 as a center axis and adjusting the height of the consol box 12.

In the drawing, reference numeral 10*a* represents a suspension seat in which a driver's seat 10 is engaged.

The operation of the control lever safety apparatus for a heavy equipment according to the present invention will be described with reference to the accompanying drawings.

Figure 3:
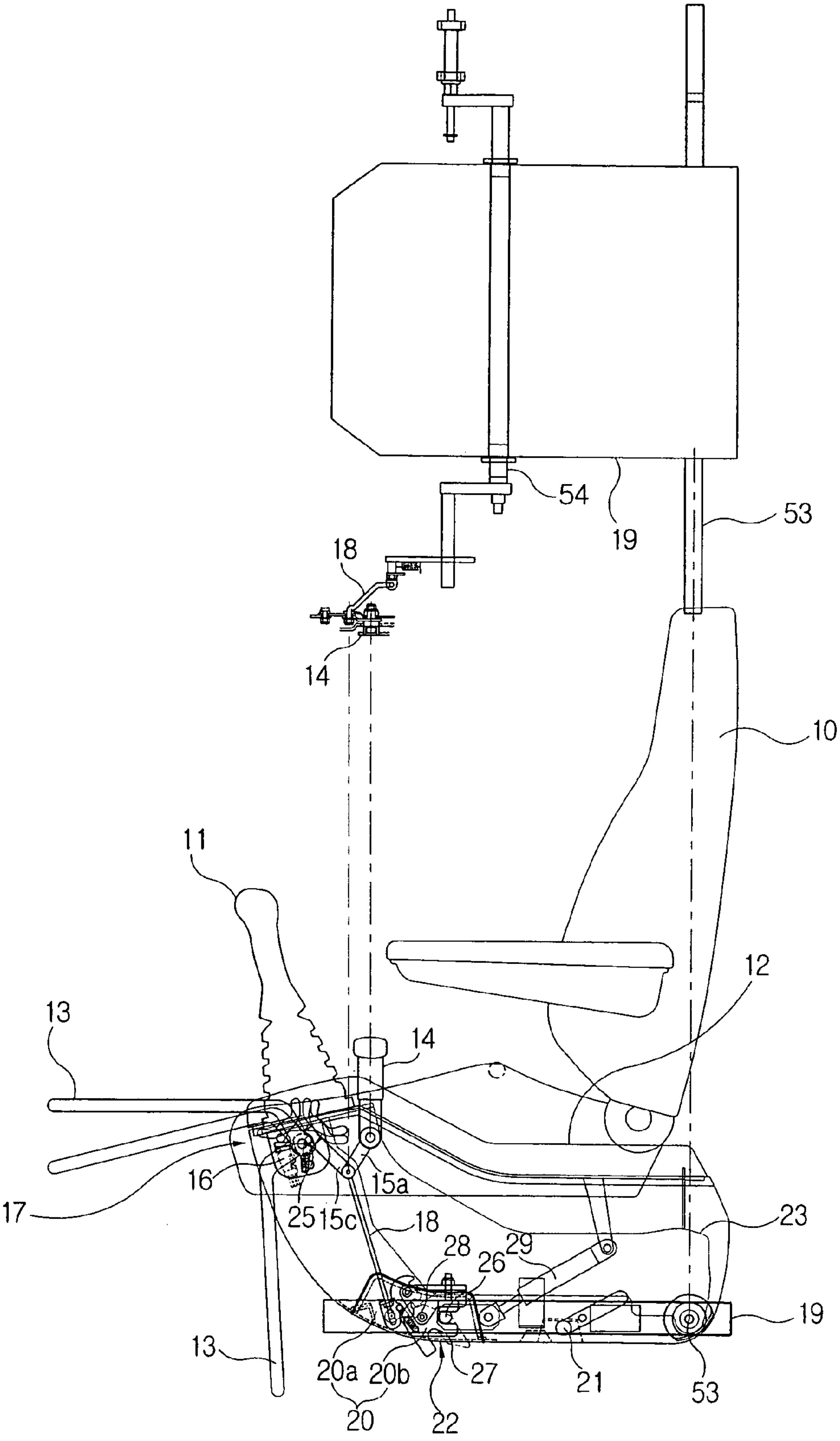
FIG. 3 is a view illustrating a state that an operation of a control lever is possible in a control lever safety apparatus for a heavy equipment according to the present invention.

(a) In the case that a work is performed by driving a work apparatus by operating a control lever in a state that a driver sits at a driver's seat of the equipment in which a consol box is tiltable, as shown in FIG. 3, when the latch assembly 22 is locked to the second support 19, and the safety lever 13 maintains a horizontal state as indicated by the full line in the drawing, the power of the first limit switch 16 engaged in the first support 23 maintains an on state.

In addition, the second limit switch 21 engaged in the second support 19 maintains an on state based on a support by an operation plate 40 for the second limit switch 21 engaged in the consol box 12.

Since an electrical signal is supplied to the control lever 11 only when the first and second limit switches 16 and 21 maintain the on state power, a desired safety is implemented by driving the work apparatus based on the above operation characteristic.

The heavy equipment is generally used in a band work environment. Therefore, in the case that at least one of the first and second limit switches 16 and 21 has a problem in operation or in the case that the consol box 12 is tilted in order for a driver to escape from the driving seat, it is possible to prevent a safety accident which may occurs due to an operation of the work apparatus when the control lever 11 is operated by a driver or is touched by mistake in such a manner that an electrical signal supplied to the control lever 11 is disconnected.

Figure 5:
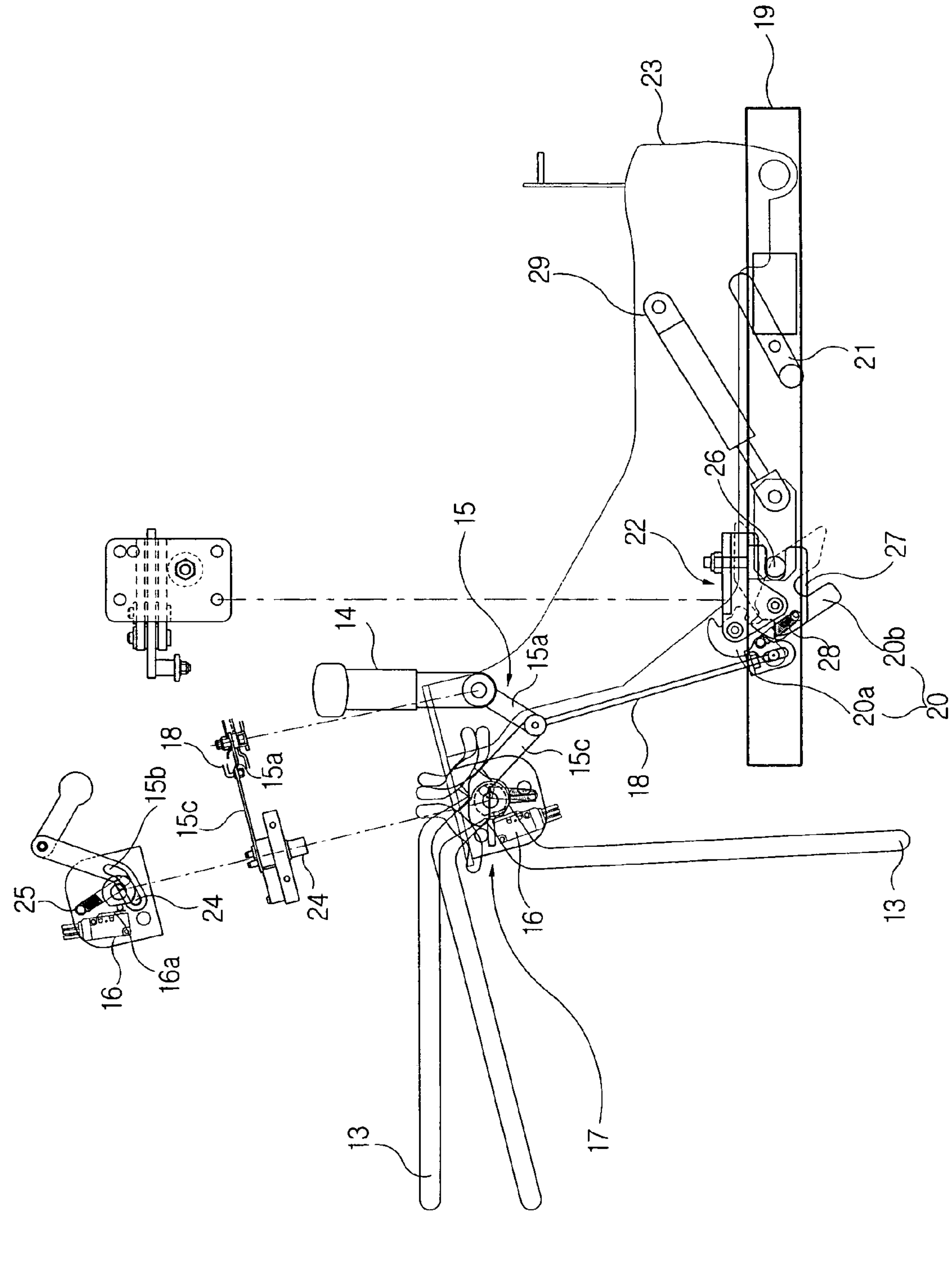
FIG. 5 is an enlarged view illustrating a driving portion of a safety lever in a control lever safety apparatus for a heavy equipment according to the present invention.

(b) In the case that a driver sits in a driver's seat or takes a relax therein without operating a control lever in a driver's seat of a heavy equipment in which a consol box is tiltable, as shown in FIGS. 3 and 5, in the case that the consol box tilting lever 14 is pulled in a direction of the driver's seat 10(pulling in a right direction in FIG. 3), the first and second joints 15*a* and 15*c* link-hinged to the consol box tilting lever 14 are link-moved. In addition, it is moved in a lower direction in the elongated hole 15*b* by pressurizing the locking shaft 24 into the elongated hole 15*b* formed in a lower portion of the second joint 15*c.*

At this time, the safety lever 13 is rotated in the counter clockwise direction and is moved in a lower direction indicated by the imaginary line in FIG. 3 and pressurizes the lever 16*a* of the first limit switch 16 when the safety lever 13 is rotated, so that the power is automatically turned off. Therefore, the electrical signal supplied to the control lever 11 is disconnected. Even when the control lever 11 is operated, it is impossible to operate the work apparatus.

Therefore, in a state that the equipment is started, in the case that a driver sits in the driver's seat 10 without working or takes a relax therein, since the safety lever 13 is tilted in the lower direction, it is possible to prevent the work apparatus from being driven even when the control lever 11 is operated or touched by a driver by mistake, for thereby obtaining a safety of the equipment.

Figure 4:
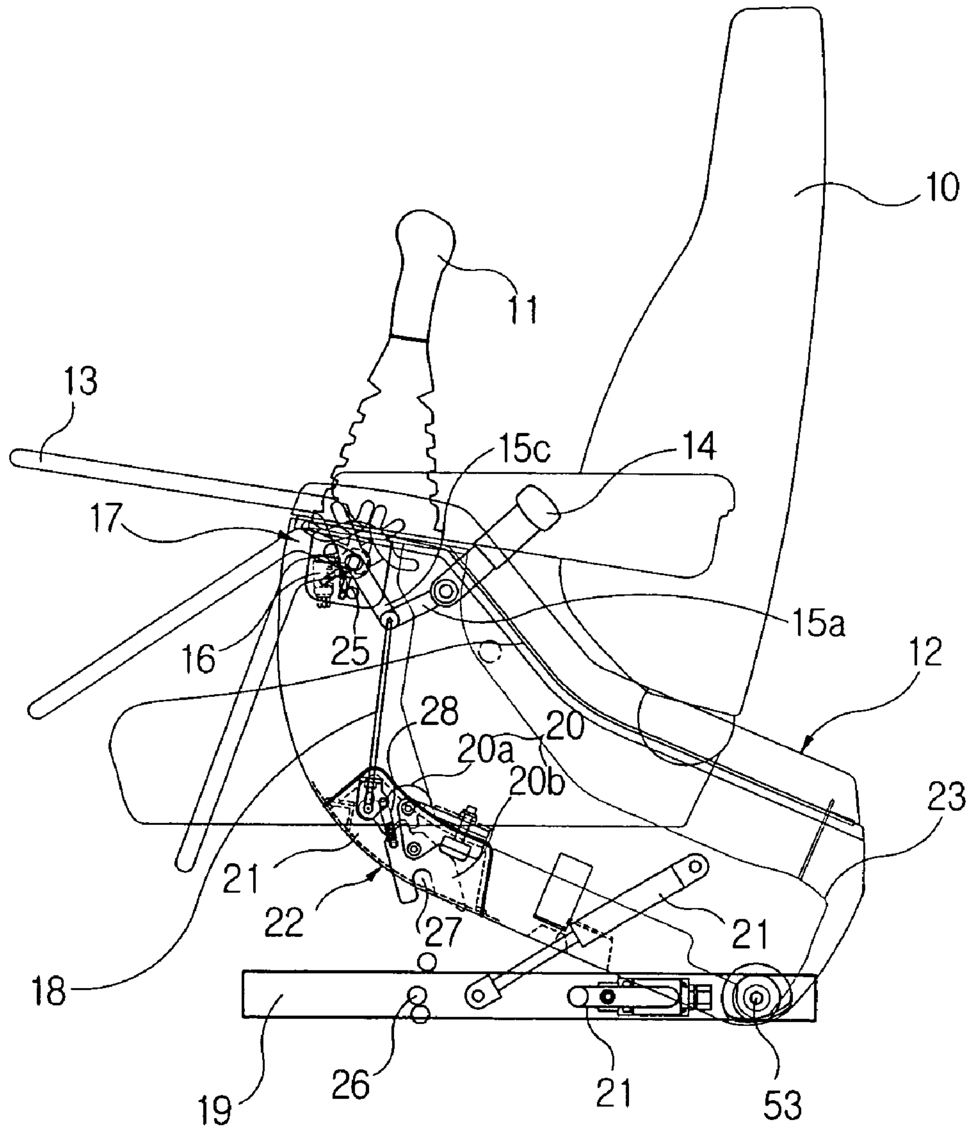
FIG. 4 is a view illustrating a state that an operation of a control lever is impossible due to a rotation of a consol box in a control lever safety apparatus for a heavy equipment according to the present invention.

(c) In the case that a driver escapes from a driver's seat in a state that an equipment in which a consol box is tiltable is started, as shown in FIGS. 3 and 4, when the consol box tilting lever 14 is pulled in a direction of the driver's seat 10, since the rod 18 is slightly lifted in an upper direction by a rotation of the first and second joints 15*a* and 15*c,* the latch 20 connected to a lower side of the rod 18 is escaped from the locking shaft 26 formed in the second support 19.

Therefore, the consol box 12 is rotated in the clockwise direction about the hinge shaft 53 as a center axis by an elastic force of the gas spring 29 fixed to the first support 23 and the second support 19, so that a tilting operation as shown in FIG. 4 is implemented.

Therefore, an electrical signal supplied to the control lever 11 is disconnected in such a manner that the second limit switch 21 engaged in the second support 19 and the operation plate 40 for the second limit switch 21 fixed to the consol box 12 are separated from each other, and then the power of the second limit switch 21 is switched to the off state.

Namely, in the case that a driver is escaped from the driver's seat 10 in a state that the equipment is started, since the consol box 12 is tilted in a backward direction of the driver's seat 10, an entry of the driver is easily implemented. Even when the driver touches or operates the control lever 11 by mistake while the driver is escaped from or returns to the driver's seat 10, since the safety lever 13 is tilted in the lower direction, and the consol box 12 is tilted, it is impossible to drive the work apparatus even when the control lever 11 is operated.

Therefore, the driver is capable of easily escaping from or returning to the driver's seat 10 in a state that the equipment is started.

In the case that a driver returns to a driver's seat and starts a work by operating the control lever 11 by returning the consol box 12 to its original position, the consol box 12 is returned to its original position in such a manner that the consol box 12 is pressurized in a counter clockwise direction about the hinge shaft 53 of the second support 19 as a central axis.

At this time, since the safety lever 13 is tilted in a lower direction, even when a driver touches the control lever 11 by mistake when pressurizing the consol box 12, since the electrical signal supplied to the control lever 11 is disconnected, it is possible to prevent the work apparatus from being operated.

Namely, even when the consol box 12 is being returned to the original position or is returned, it is possible to maintain a power disconnected state in the control lever 11 in a state that the safety lever 13 is not lifted in a horizontal direction by a driver.

Figure 7:
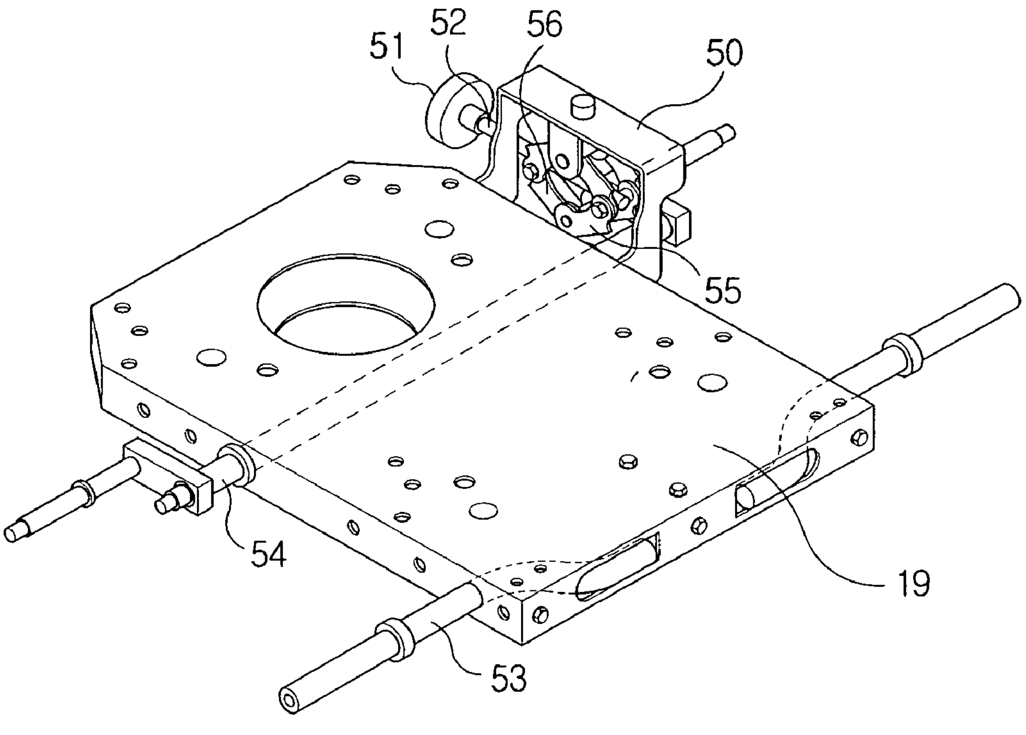
FIG. 7 is a perspective view illustrating a lifting and lowering unit which lifts and lowers a consol box in a control lever safety apparatus for a heavy equipment according to the present invention.
Figure 8:
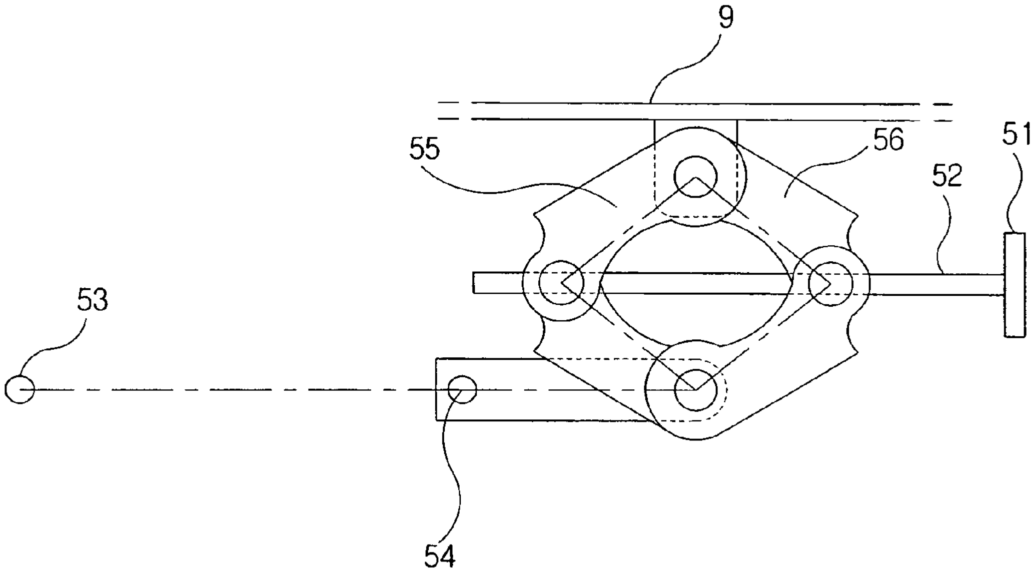
FIG. 8 is a side enlarged view illustrating a lifting and lowering unit of FIG. 7.

As shown in FIGS. 7 through 9, in the control lever safety apparatus for a heavy equipment according to the present invention, it is possible to selectively adjust the height of the control lever 11 by tilting the consol box 12 in a direction of the driver based on a body shape of the driver.

Figure 9A:
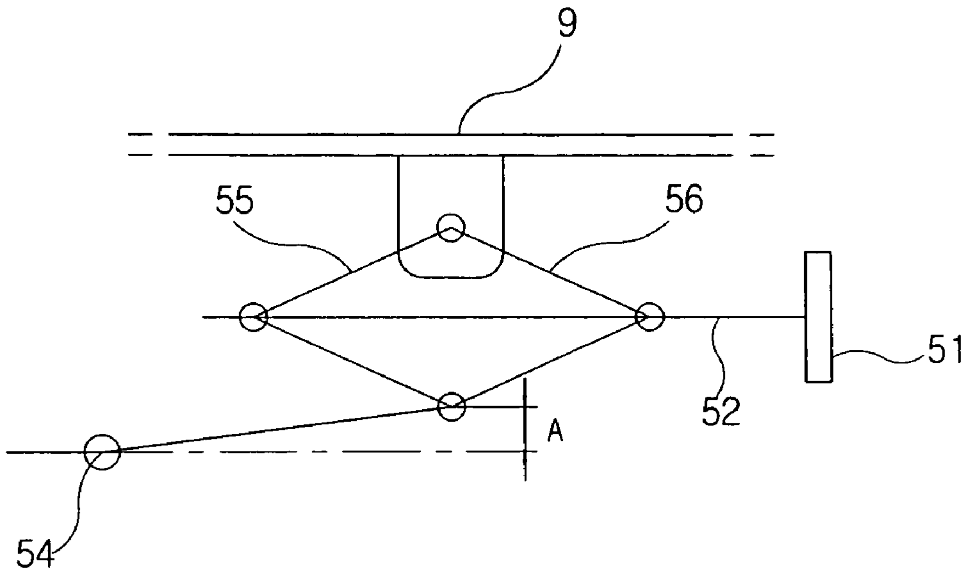
FIGS. 9A and 9B are views for describing an operation principle of a lifting and lowering unit of FIG. 7.

As shown in FIG. 9*a,* in the case that the adjusting knob 51 is rotated in the clockwise direction, since a pair of the link members 55 and 56 threaded to the handle shaft 52 are moved in a left direction along the handle shaft 52, the consol box 12 is lifted by the height "A" about the hinge shaft 54 fixed to the second support 19 as a central axis. Therefore, it is possible to lift the control lever 11 by the height "A" with reference to the height of the hinge shaft 53 formed in a rear side of the second support 19.

Figure 9B:
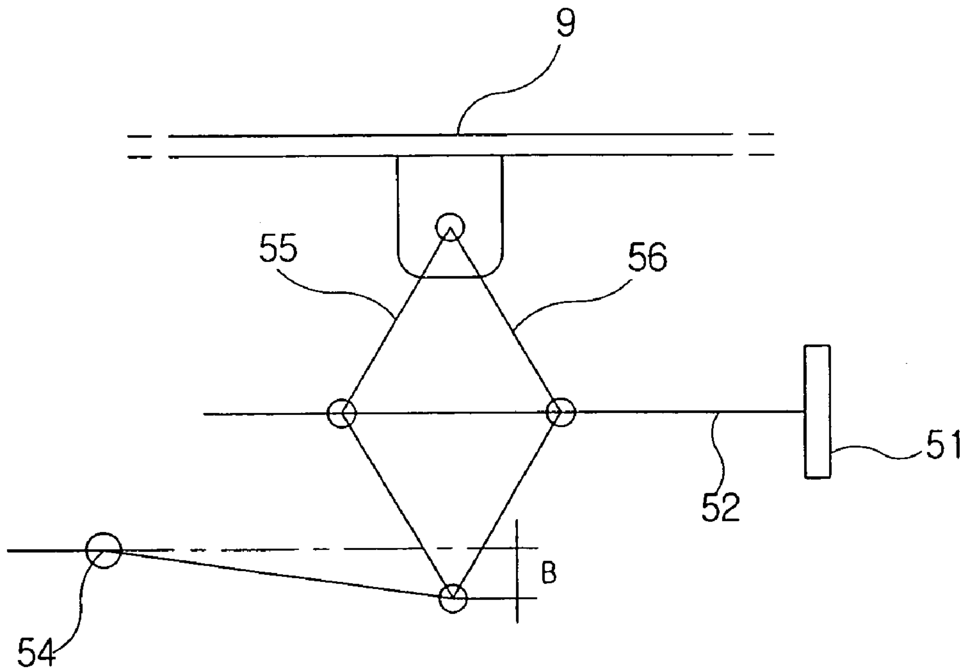

In addition, as shown in FIG. 9B, in the case that the adjusting knob 51 is rotated in the counter clockwise direction, since a pair of the link members 55 and 56 threaded to the handle shaft 52 are moved in an inner direction along the handle shaft 52, the consol box 12 is lowered by the height "B" about the rotary shaft 54 fixed to the second support 19 as a central axis. Therefore, it is possible to lower the control lever 11 by the height "B" with reference to the hinge shaft 53 formed in a rear side of the second support 19.

Figure 6:
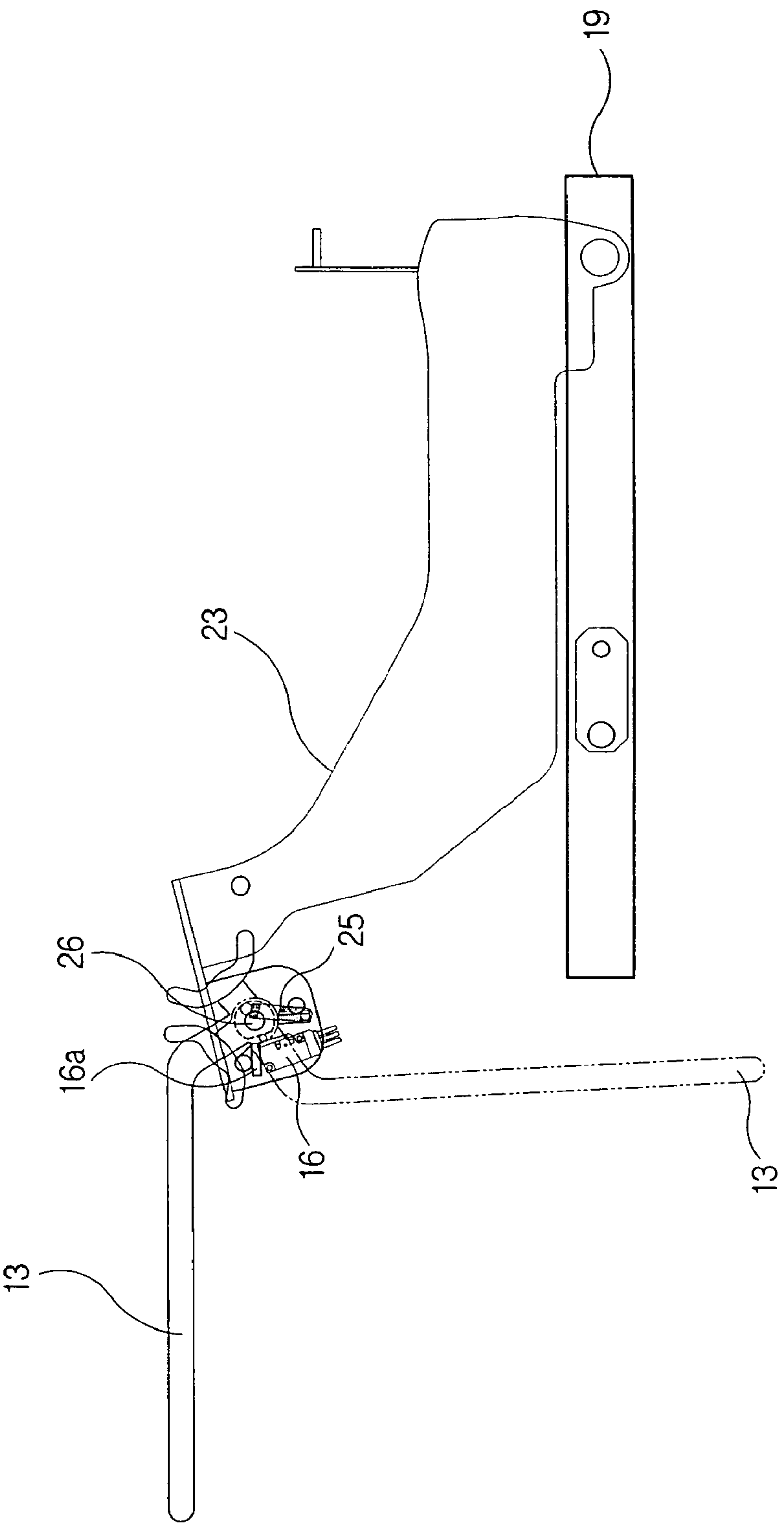
FIG. 6 is a view illustrating a control lever safety apparatus for a heavy equipment according to another embodiment of the present invention.

As shown in FIG. 6, the control lever safety apparatus for a heavy equipment according to another embodiment of the present invention is adapted to a heavy equipment in which a consol box(not shown) is not tilted and includes a consol box which is installed at both sides of a driver's seat and has a control lever adapted to operate a work apparatus, a first limit switch 16 which is connected with the control lever, a safety lever 13 which is rotatably fixed to a first support 23 to which the consol box in the side of an entrance door of the driving room is fixed, a locking shaft 26 which is connected with a lever 16*a* for turning on and off the power of the first limit switch 16, and an elastic member 25 which supports the locking shaft 26 in order for the power of the first limit switch 16 to be in the on state for thereby maintaining the safety lever 13 in a horizontal direction based on an elastic bias operation as an initial state.

Therefore, in the case that a driver is escaped from the driver's seat during a work or sits without working in a state that the equipment is started or takes a relax, the safety lever 13 is tilted by the driver in the counter clockwise direction indicated by the imaginary line in the drawing, so that the lever 16*a* of the first limit switch 16 is pressurized by the rotation of the locking shaft 26 when tilting the safety lever 13. Therefore, it is possible to disconnect an electrical signal supplied to the control lever by switching the power of the first limit switch 16 to an off state.

Figure 10:
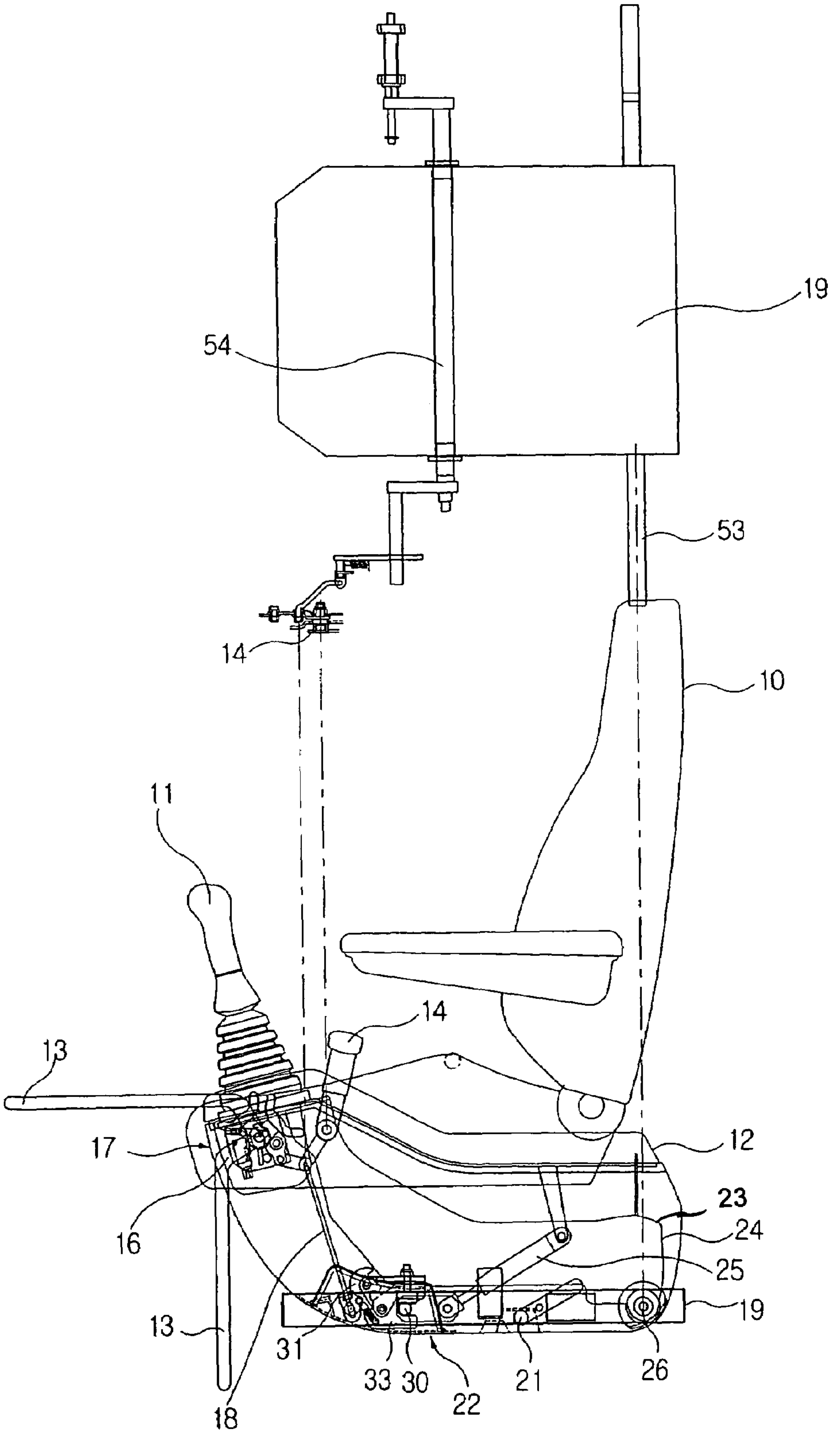
FIG. 10 is a side view illustrating a control lever safety apparatus for a heavy equipment according to another embodiment of the present invention.
Figure 11:
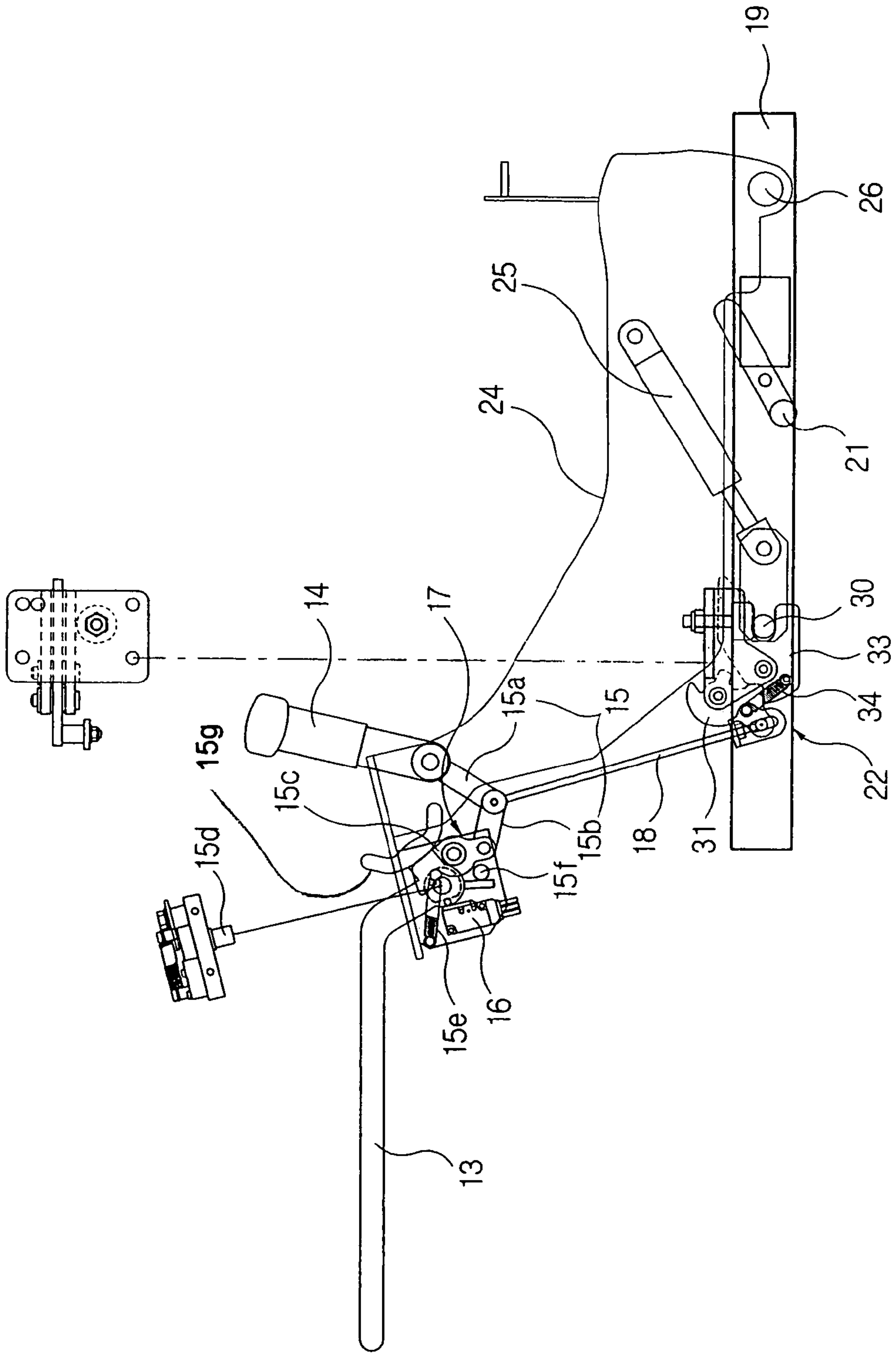
FIG. 11 is a view for describing an operation of a control lever safety apparatus for a heavy equipment according to another embodiment of the present invention.

As shown in FIGS. 10 and 11, in the control lever safety apparatus for a heavy equipment according to another embodiment of the present invention, the operation switch assembly 17 includes a first joint 15*a* having one end hinged to a lower portion of the consol box tilting lever 14, a second joint 15*b* which is hinged to the other end of the first joint 15*a,* a catch plate 15*c* which is hinged to the other end of the second joint 15*b* and has a locking groove 15*g* formed in one side of the same, a locking shaft 15*d* which is engaged to the locking groove 15*g* for maintaining the safety lever 13 in a horizontal state, and an elastic member 15*e* which maintains the safety lever 13 in a horizontal state in order for the power of the first limit switch 16 to maintain an on state in such a manner that the locking shaft 15*d* is engaged to the locking groove 15*g* based on an elastic bias operation.

Therefore, in the case that the consol box tilting lever 14 is pulled in a right direction, the safety lever 13 is rotated in the counter clockwise direction by the rotation of the catch plate 15*c* connected to the joint 15*b* hinged to the consol box tilting lever 14, so that it is possible to disconnect an electric signal supplied to the control lever 11 in such a manner that the power of the first limit switch 16 connected with the safety lever 13 is switched to the off state.

In a state that the safety lever 13 is tilted, when the consol box tilting lever 14 is slightly pulled, since the consol box 12 is tilted by an elastic force of the gas spring 25 in a state that the latch 33 is escaped from the locking shaft 33, it is possible to disconnect an electrical signal supplied to the control lever 11 in such a manner that the power of the second limit switch 21 is switched to the off state.

Namely, since the safety lever 13 is tilted, and the consol box 12 is tilted, it is impossible to drive the work apparatus even when the control lever 11 is operated.

At this time, since the consol box 12 having the control lever 11, the consol box tilting lever 14, the safety lever 13 adapted to disconnect the power of the first limit switch 16 connected with the control lever 11 when it is tilted during the rotation of the consol box tilting lever 14, the latch assembly 22 which is adapted to disconnect the power of the second limit switch 21 connected with the control lever 11 by tilting the consol box 12 in the upper direction based on the rotation of the consol box tilting lever 14, etc. are same as the earlier embodiment of the present invention, the construction and operation of the same are omitted. In addition, the same elements as the earlier embodiment of the present invention were given the same reference numerals.

Figure 12:
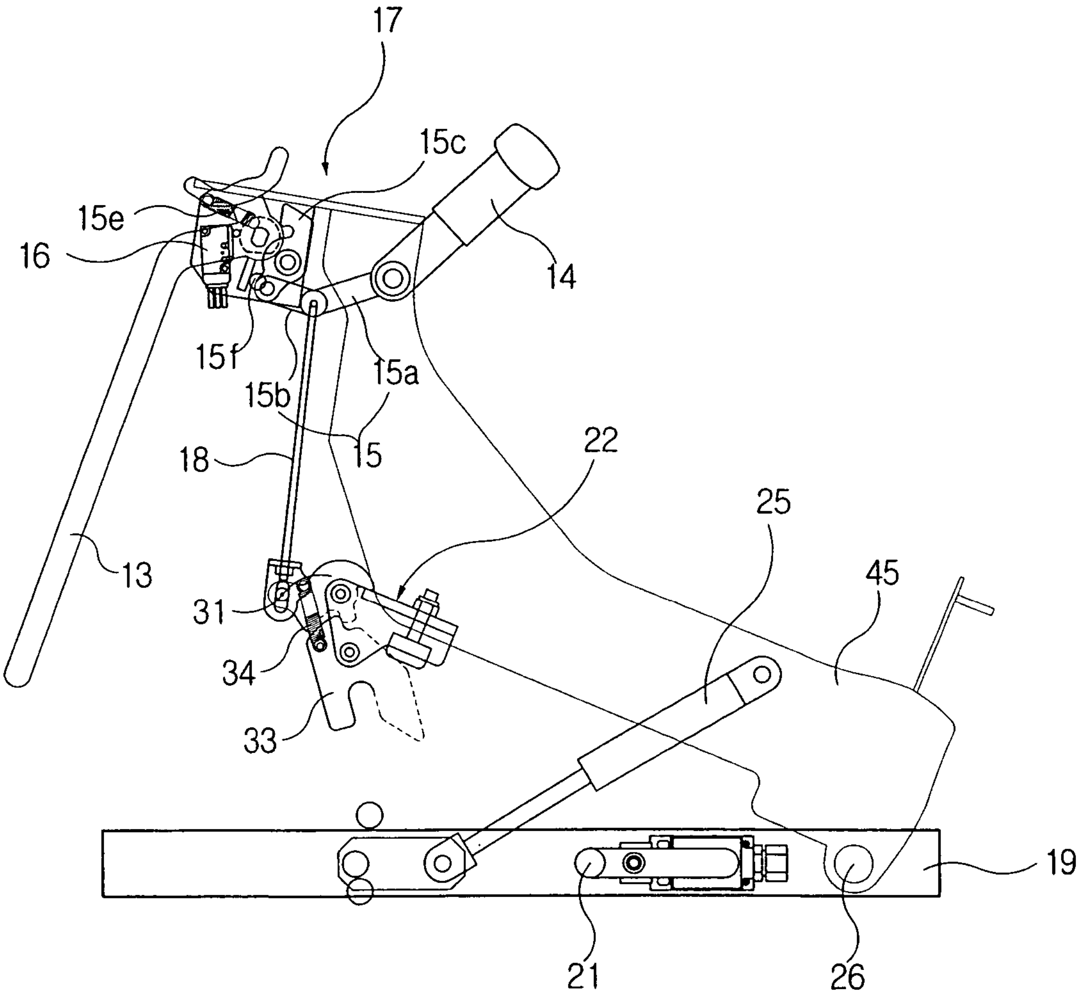
FIG. 12 is a side view illustrating a control lever safety apparatus for a heavy equipment according to another embodiment of the present invention.

As shown in FIG. 12, the control lever safety apparatus for a heavy equipment according to another embodiment of the present invention is adapted to an equipment in which a consol box(not shown) is not tilted. The safety lever 13, the consol box tilting lever 14, the operation switch assembly 17 and the latch assembly 22 are rotatably fixed to the support 19 to which the driver's seat 10 is engaged, and are engaged to an additional support 45 which is separated with respect to the consol box 12 and is rotated. Since the construction and operation of the same are same as the embodiment of FIGS. 10 and 11, the descriptions of the same will be omitted. In addition, the same elements as the earlier embodiment of the present invention will be given the same reference numerals.

The control lever safety apparatus for a heavy equipment according to the present invention has the following advantages.

In the case that a driver tilts a consol box for escaping from a driver's seat, since an electrical signal connected with a control lever is automatically disconnected due to a tilting operation of a safety lever, it is possible to prevent a work apparatus from being operated even when a driver operates or touches a control lever by mistake in a state that an equipment is started.

In addition, the height of a control lever which is changed based on various body shapes of a driver is selectively adjusted, for thereby providing a convenience to a driver. In the case that a driver works for a long time in the same posture, it is possible to enhance a workability based on the optimum work environment.

Furthermore, it is possible to prevent a safety accident which may occur due to an error operation of a control lever by a driver, by integrating a safety lever operation method irrespective of the kinds of equipments.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A control lever safety apparatus for a heavy equipment, comprising:

a consol box which is tiltably installed at one side surface of a driver's seat and has a control lever for operating a work apparatus;

a safety lever which is rotatably fixed to a first support to which the consol is fixed;

a consol box tilting lever which is rotatably fixed to the first support;

an operation switch assembly which is rotatably connected with a joint member fixed to the first support to be link-moved with the consol box tilting lever and horizontally supports the safety lever and disconnects a power of a first limit switch connected with the control lever by downwardly tilting the safety lever when the consol box tilting lever is rotated; and a latch assembly which is connected to a rod connected with a joint method on the basis of a link movement method and disconnects a power of a second limit switch disconnected with the control lever by tilting the consol box in an upper direction when the consol box tilting lever is rotated, in such a manner that a latch fixed to the first support is detachably engaged to a second support in which the driver seat is fixed;

wherein said operation switch assembly includes:

a first joint which has one end hinged to a lower portion of the consol box tilting lever;

a second joint which is hinged to the other end of the first joint;

a catch plate which is hinged to the other end of the second joint and has a locking groove in one side of the same;

a locking shaft which is engaged to the locking groove and maintains the safety lever in a horizontal state; and an elastic member which engages the locking shaft to the locking groove and maintains the safety lever in the horizontal state based on an elastic bias operation as an initial state in order for the power of the first limit switch to maintain an on state.

* * * * *